United States Patent [19]
Roberts et al.

[11] 3,766,004
[45] Oct. 16, 1973

[54] LASER ASSISTED NEUTRON GENERATOR

[75] Inventors: Thomas G. Roberts; Romas A. Shatas; Harry C. Meyer, III; John D. Stettler, all of Huntsville, Ala.

[73] Assignee: The United States of America as represented by the Secretary of the Army, Washington, D.C.

[22] Filed: July 19, 1971

[21] Appl. No.: 163,793

[52] U.S. Cl. .................. 176/1, 176/8, 331/94.5, 313/61, 315/111, 250/54.5
[51] Int. Cl. .............................................. B21b 1/00
[58] Field of Search .................. 176/1–9; 331/94.5; 313/161, 61; 315/111

[56] References Cited
UNITED STATES PATENTS
| | | | |
|---|---|---|---|
| 3,378,446 | 4/1968 | Whittlesey | 176/1 |
| 3,489,645 | 1/1970 | Daiber et al. | 176/1 |
| 3,652,393 | 3/1972 | Kaiser et al. | 176/1 |
| 3,120,481 | 2/1964 | Post | 176/8 |
| 3,189,523 | 6/1965 | Patrick | 176/8 |

FOREIGN PATENTS OR APPLICATIONS
| | | | |
|---|---|---|---|
| 1,153,599 | 5/1969 | Great Britain | 176/1 |
| 1,430,453 | 1/1968 | France | 176/1 |

OTHER PUBLICATIONS

Science Vol. 167, Feb. 20, 1970, pp. 1112, 1113.
E. B. Rechsteiner and Saxe, Masers and Lasers, pub. by Technology Markets, Inc., 509 Fifth Ave. N.Y. 17, N.Y., page 57, May 23, 1962.
Laser News (Laser Technology Section Mar. 1969) pg. 92.

Primary Examiner—Reuben Epstein
Attorney—Harry M. Saragovitz et al.

[57] ABSTRACT

A high density pulsed plasma generator produces a high temperature plasma which is sensed by a photo switch which in turn triggers the operation of a high energy pulsed laser. The frequency of the laser light is such that the plasma will absorb it.

1 Claim, 2 Drawing Figures

FIG. I

Thomas G. Roberts
Romas A. Shatas
Harry C. Meyer, III
John D. Stettler,
INVENTORS.

Patented Oct. 16, 1973

Thomas G. Roberts
Romas A. Shatas
Harry C. Meyer, III
John D. Stettler,
INVENTORS.

3,766,004

LASER ASSISTED NEUTRON GENERATOR

BACKGROUND OF THE INVENTION

This invention is related to the field of neutron generators. More specifically this invention is related to a neutron generator which is assisted by a pulse laser device. In the prior art devices pulses of neutrons could only be obtained from plasma generators like those developed in research on controlled thermonuclear devices, from pulsed fission reactors, and from laser created plasma where a high energy pulse of a laser is used to heat a target. The fission reactors are very expensive and produce radioactive waste.

SUMMARY OF THE INVENTION

This invention consists of a high energy pulsed $CO_2$ laser ($10^3$ joules or more at 10.6 $\mu$m) and a high density pulsed plasma generator ($2 \times 10^{19}$ cm$^{-3}$ or more at a temperature of several keV [$10^7$K] or more) arranged and operated so that the laser beam is focused on the volume where the high density plasma is produced. The timing of the events is accomplished by use of a photo switch to determine when the plasma is to be in the desired volume and then firing the laser circuit so that the laser beam will reach the plasma when desired. In this manner the jitter of all the switches on the plasma generator is by-passed so that the time when the plasma volume is filled is known within approximately a nanosecond, and the only jitter which has to be minimized is in the time required to erect the Marx bank generator of the laser device.

DESCRIPTION OF THE PREFERRED EMBODIMENTS

The laser assisted neutron generator is a device that utilizes the interaction of a laser beam of the proper frequency with a hot deuterium-tritium plasma to create the necessary conditions for the increase in production of neutrons in fusion reactions. Although the plasma generator already produces neutrons, the cross section of the fusion reactions increases very rapidly with increasing temperature if the temperature is raised above that obtainable by the plasma generator. Therefore, a high energy laser pulse is used to increase the temperature of the plasma, and even relatively small increases in the temperature of the plasma by adsorption of the laser energy yields a significant increase in the rate of neutron production. The frequency or wavelength of the laser light has to be such that the plasma will absorb it, and the combination and interaction of a particular high energy pulsed laser at 10.6 microns and a particular type of plasma generator where conditions are proper for the absorption of this energy.

A simple correction to the plasma absorbance expression based on the inverse Bremstrahlung (including the stimulated emission) yields a penetration depth of the order of $$d \approx 10^{22} T_e^{\frac{3}{2}} \sqrt{\frac{1-\left(\frac{\omega_p}{\omega}\right)^2}{GN_e^2\lambda^2}} \text{ [cm]}$$

where $T_e$ is the electron temperature in °K; G is the Gaunt factor — of order of 10 at the temperature of these plasmas, $N_e$ is the number of electrons per cubic centimeter, $\lambda$ is the laser wavelength, and $\omega$ and $\omega_p$ are the laser frequency and plasma frequency, respectively. At $\omega \approx \omega_p$, this expression shows a singularity which could be evaluated by considering the analogy of the skin effect in metals, the anomalous resistivity of plasmas in high electro-magnetic fields, or the nonlinear effects of laser propagation in dense plasmas and indications are that for a plasma whose electron density is $2 \times 10^{19}$ cm$^{-3}$ and whose temperature is $10^7$K, a 75 percent absorption of the incident beam occurs within a distance $d \approx 2\lambda$ when $\omega \approx \omega_p$. Therefore, plasma volumes of the order of $(2\lambda)^3 \approx 10^{-6}$ cm$^3$ for $CO_2$ laser radiation should be sufficient to absorb most of the incident laser beam when $\omega \approx \omega_p$. The absorption of this energy will increase the temperature of the plasma and thereby increase the number of neutrons produced by the plasma. When the plasma temperature is increased the neutron production goes up by the ratio of $\overline{v\sigma}$ at the final temperature to $\overline{v\sigma}$ at the initial temperature. Here $\overline{v\sigma}$ is the product of the relative velocity v and the reaction cross section $\sigma$ averaged over the velocity distribution of the ions. For the conditions considered here doubling the temperature can cause more than one order of magnitude increase in the neutron yield.

Figure 1:
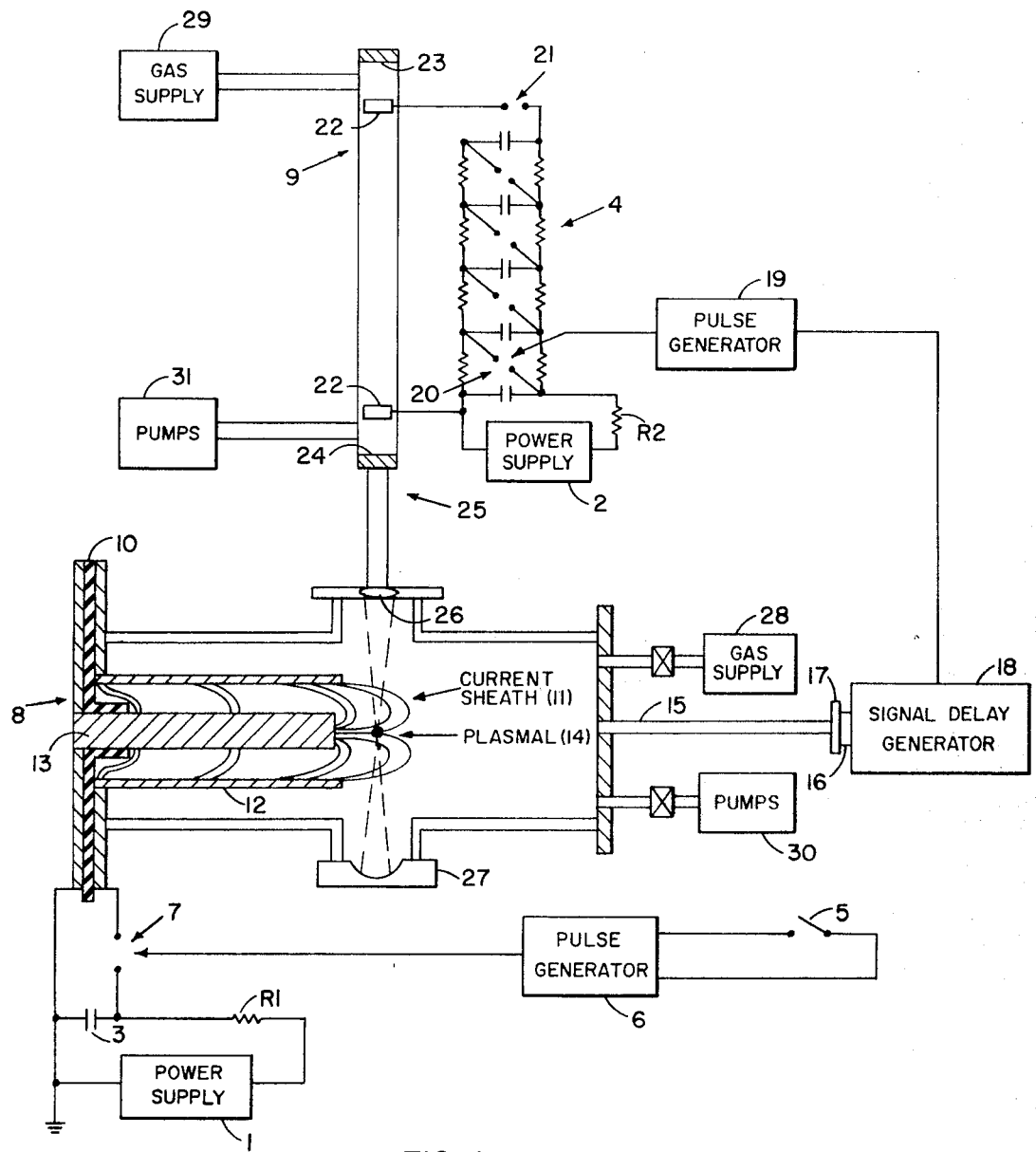
FIG. 1 is a symbolic showing of one preferred embodiment of the present invention.

Referring to FIG. 1, before the sequence of events is started both the coaxial plasma gun 8 and the high energy $CO_2$ laser 9 are filled to the desired pressures with the gases to be used; and the power supplied 1 and 2 have charged through their respective charging resistors R1 and R2 the condenser bank 3 and the Marx generator 4 to the working voltages. The sequence of events is now started by closing starting switch 5. This causes the pulse generator 6 to close the switch 7 and the voltage of the condenser bank 3 appears across the electrodes of the coaxial plasma gun 8. The gas in the coaxial plasma gun breaks down near insulator 10 forming the current sheath 11. The current sheath then propagates between the outer electrode 12 and the center electrode 13. The current sheath is driven by the magnetic pressure of its own magnetic field, and the discharge becomes more intense as the sheath propagates. When the current sheath reaches the end of the electrodes it folds back on itself and rapidly collapses the plasma toward the axis of the tube as in a z-pinch. This produces the hot plasma volume 14 where the number density may be as high as $2.10^{19}$ cm$^{-3}$, the temperature may be as high as several keV, and the confining magnetic fields are of the order of megagauss. At this time and for a period of the order of a microsecond neutrons are produced. As the current sheath is moving down the coaxial gun and the high intensity of the discharge increases, it is being detected by light pipe 15 which carries it to photo diode 16 after having passed through the variable optical attenuator 17. Variable optical attenuator 17 is preset so that the light intensity will not cause the signal delay generator 18 to begin operating until the current sheath has reached a predetermined location in the coaxial plasma gun. In this manner the jitter of all events prior to the time the signal delay generator is started are avoided and have no effect on the problem of synchronizing the laser firing. The signal which starts signal delay generator 18 is delayed a preset amount and is then used to start pulse generator 19 which triggers switch 20. This causes Marx bank 4 to erect itself in a few nanoseconds so that when switch 21 breaks down, the entire voltage of the erected Marx bank appears across electrodes 22 of the high energy pulsed $CO_2$ laser 9. The gas in the high energy laser breaks down in such a manner that a very large inversion is produced (between 001 and 100 states of $CO_2$). This creates a medium of very high gain between mirrors 23 and 24. Therefore, oscillations are set up between the mirrors and the energy in the inversion is extracted in a pulse of radiation at 10.6 $\mu$m. The shape of this pulse can be tailored somewhat if desired by rotating mirror 23 so that the laser is Q-switched. The laser beam 25 is focused onto plasma volume 14 by lens 26 which may be made of NaCl or any other material which transmits energy at 10.6 $\mu$m. The spherical reflector 27 is made to focus back onto the plasma volume the laser radiation which is not absorbed by the plasma in a single pass and some of the radiation which is generated by the plasma. By focusing the laser beam on the plasma volume at the proper time, the laser energy is absorbed by the plasma so that the plasma is further heated. This heating of the plasma increases the cross section for the fusion reaction and thereby substantially increases the neutron yeild.

In order to operate the laser assisted neutron generator again one must first change the gases in the coaxial plasma gun and the high energy $CO_2$ laser by way of gas supplies 28 and 29 and pumps 30 and 31 and recharge condenser bank 3 and Marx generator 4.

Figure 2:
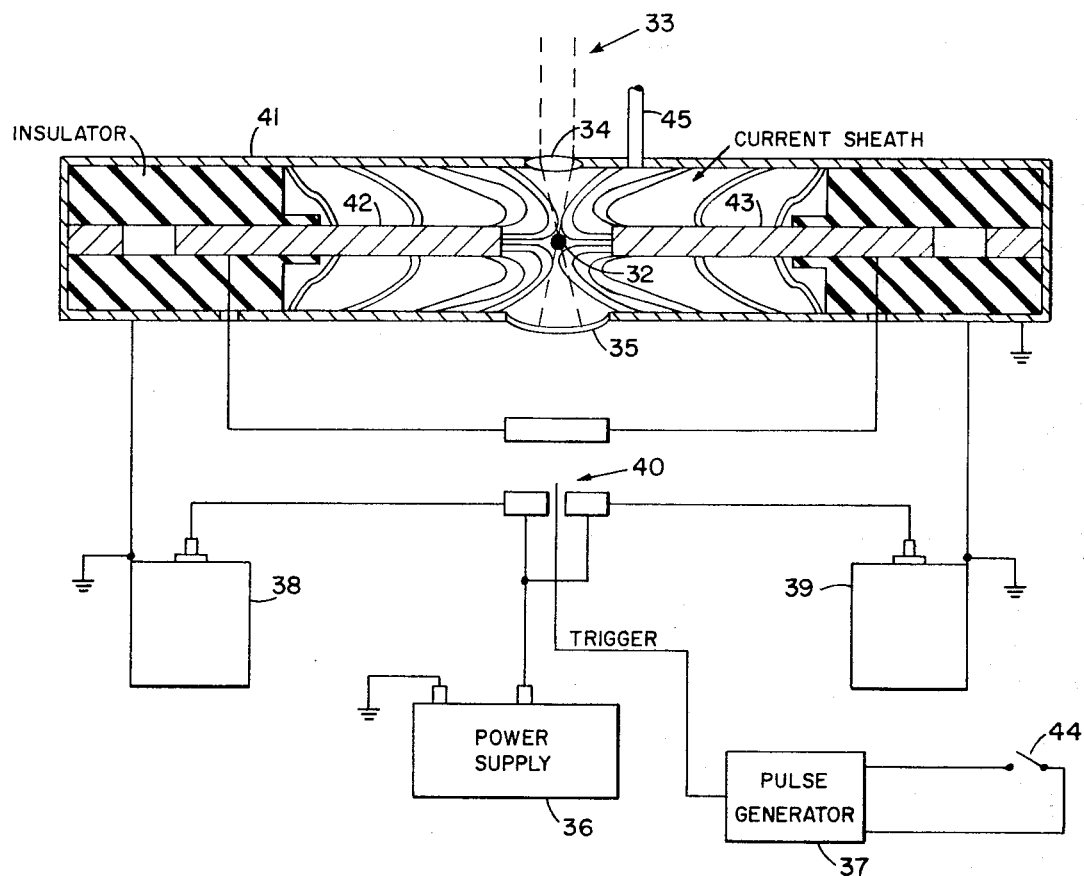
FIG. 2 symbolically shows a different plasma generator which may be used in the present invention.

FIG. 2 shows another plasma gun that may be used in this invention. This plasma gun acts like a focus device so as to concentrate the plasma 32 which the laser beam 33 will be focused on by lens 34 and spherical reflector 35. A power supply 36, pulse generator 37, condensers 38 and 39, and triggering switch 40 are connected to outer electrode 41 and to center electrodes 42 and 43 so as to apply power thereto upon the closing of starting switch 44. This will cause current sheaths to propagate down the electrodes and concentrate into a plasma 32. A light pipe 45 is positioned so as to receive and detect radiation emanating from the current sheath being generated by the plasma generator. This light pipe is then connected to equipment such as that shown in FIG. 1 so as to trigger the laser (not shown) at the proper time.

We claim:

1. A device comprising a plasma generator; a plasma being generated by said plasma generator; a laser means for producing a laser beam; transferring means for directing said laser beam to said plasma so as to heat said plasma; the frequency of the wavelength of said laser being such that the plasma will absorb energy therefrom; said transferring means is a lens positioned in the wall of the plasma generator so as to focus the laser beam onto the plasma; said plasma generator is a pulsed plasma generator; said laser is a $CO_2$ pulsed laser; triggering means connected to said laser so as to trigger the laser; radiation sensing means positioned so as to detect radiation in the plasma generator and to generate a signal upon the radiation reaching a predetermined value; and said signal being received by said triggering means so as to set said triggering means into operation whereby said laser will produce its laser beam at the time the plasma reaches said predetermined value.

* * * * *